United States Patent [19]
Faulkner

[11] 3,801,888
[45] Apr. 2, 1974

[54] MOTOR SPEED CONTROL CIRCUIT

[75] Inventor: Harold Faulkner, Garland, Tex.

[73] Assignee: Hunt Electronics Company, Dallas, Tex.

[22] Filed: Feb. 9, 1972

[21] Appl. No.: 224,715

[52] U.S. Cl. .............................. 318/471, 318/334
[51] Int. Cl. .......................................... H02p 7/58
[58] Field of Search .......................... 318/334, 471

[56] References Cited
UNITED STATES PATENTS

| | | | |
|---|---|---|---|
| 3,543,119 | 11/1970 | Bauer et al. | 318/334 |
| 3,384,801 | 5/1968 | Rodgers | 318/334 |
| 3,590,365 | 6/1971 | Nelson | 318/334 X |
| 3,525,916 | 8/1970 | Chodash | 318/471 X |

Primary Examiner—B. Dobeck
Attorney, Agent, or Firm—Clegg and Cantrell

[57] ABSTRACT

Disclosed is a circuit responsive to an environmental parameter such as temperature, humidity, etc. for controlling the speed of a motor. The circuit includes circuitry for causing the motor to turn off at a first value of the environmental parameter and circuitry for causing the motor to turn on again at a second value of the parameter different from the first value by a predetermined amount.

8 Claims, 2 Drawing Figures

MOTOR SPEED CONTROL CIRCUIT

BACKGROUND OF THE INVENTION

This invention relates to motor speed control circuitry and more particularly to circuitry for providing a hysteresis effect when turning off or turning on a motor in response to certain changes in the value of some environmental parameter.

Automatic control systems for controlling various room-environmental parameters such as temperature and humidity are well-known in the art. Such systems typically include an environmental parameter responsive device (e.g. a thermostat is used in temperature control), a pump or blower motor for causing circulation of air, water or other parameter control fluid in a distribution system, and a motor speed control circuit. Variations in the environmental parameter are detected by the parameter responsive device and the motor speed control circuit is signalled accordingly. In response to such signals, the motor speed control circuit causes the motor to operate at a certain speed somewhere between zero speed and some maximum speed determined by such signals. For example, in a temperature control system operating in a heating cycle, when the temperature increases beyond a certain minimum level called the set point, the blower motor may be caused to turn off; and then when the temperature falls below the set point, the motor may be caused to turn on again. While the motor is on, its speed is maintained at a level inversely proportional to the temperature until a certain minimum temperature is reached at which point the motor operates at its maximum speed.

In systems of the type generally described above, it would be desirable to provide a hysteresis effect when either turning the motor on or turning the motor off. Then, when small fluctuations in the environmental parameter occurred about the set point, on-off cycling of the motor due to such fluctuations would be avoided.

SUMMARY OF THE INVENTION

It is an object of the present invention to provide an environmental parameter responsive motor speed control circuit which includes circuitry for preventing on-off cycling of a motor when small fluctuations in the environmental parameter occur about the set point.

This and other objects of the present invention are realized in a specific illustrative embodiment which includes circuitry for generating a difference signal whose value represents the difference between the value of some environmental parameter and a predetermined value, circuitry reponsive to the difference signal for generating a motor speed control signal having a value determined by the value of the difference signal, and circuitry for preventing the generation of the motor speed control signal when the difference signal varies in one direction to a first value and for enabling the generation of the motor speed control signal when the difference signal varies in the other direction beyond the first value to a second value. While the motor speed control signal is being generated, a motor is operated at a speed determined by the signal, whereas while the control signal is not being generated, the motor is not operated. The preventing and enabling circuitry thereby provides a hysteresis effect to prevent excessive on-off cycling of the motor when the value of difference signal is at or fluctuates about the first value.

BRIEF DESCRIPTION OF THE DRAWINGS

The above and other object and advantages of the present invention will become more apparent from the following detailed description presented in connection with the accompanying drawings in which FIGS. 1A and 1B (with FIG. 1A positioned to the left of FIG. 1B) show one illustrative embodiment of a motor speed control circuit which includes circuitry for providing a hysteresis effect in controlling the on-off operation of a motor.

DETAILED DESCRIPTION

Figure 1A:
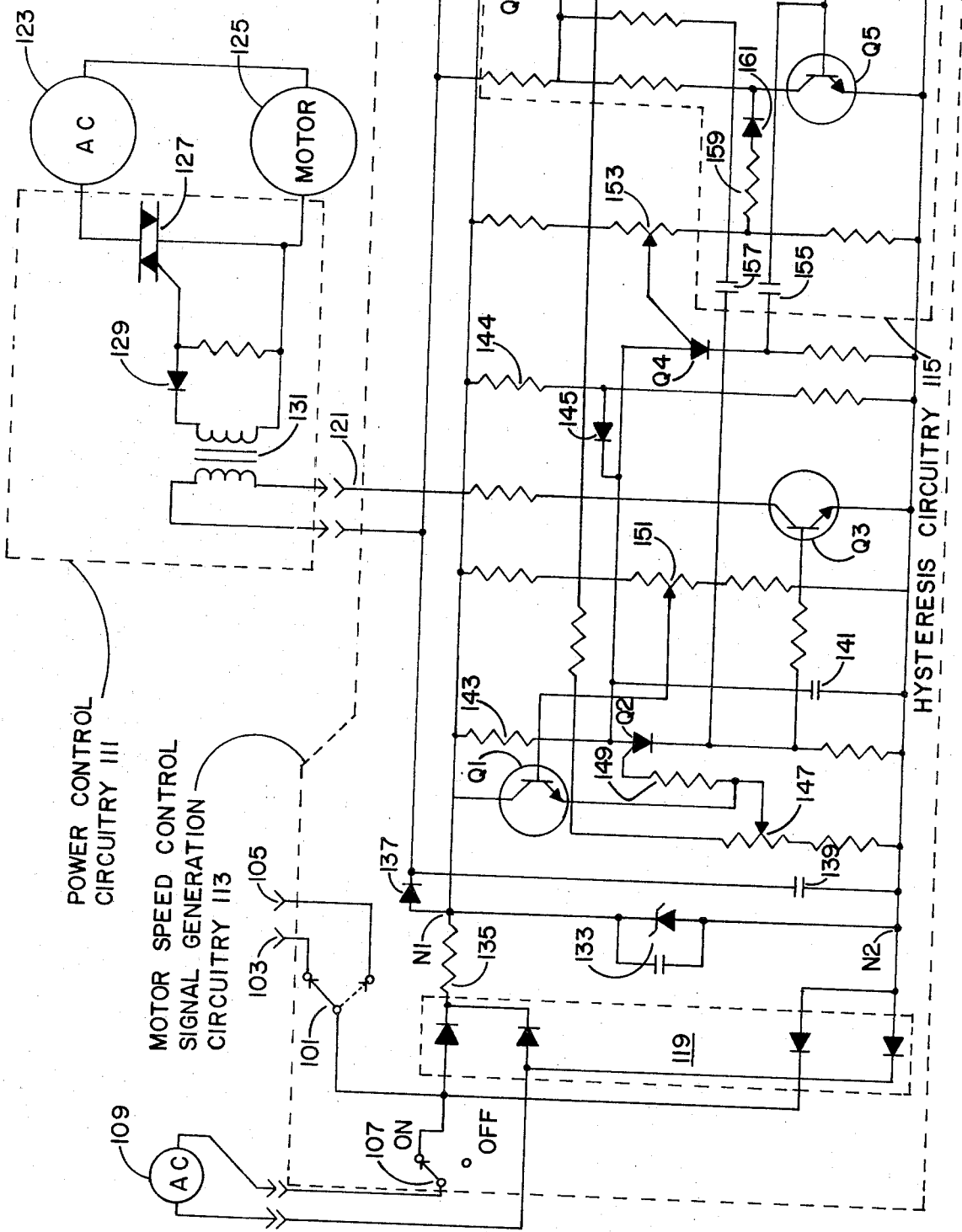
Figure 1B:
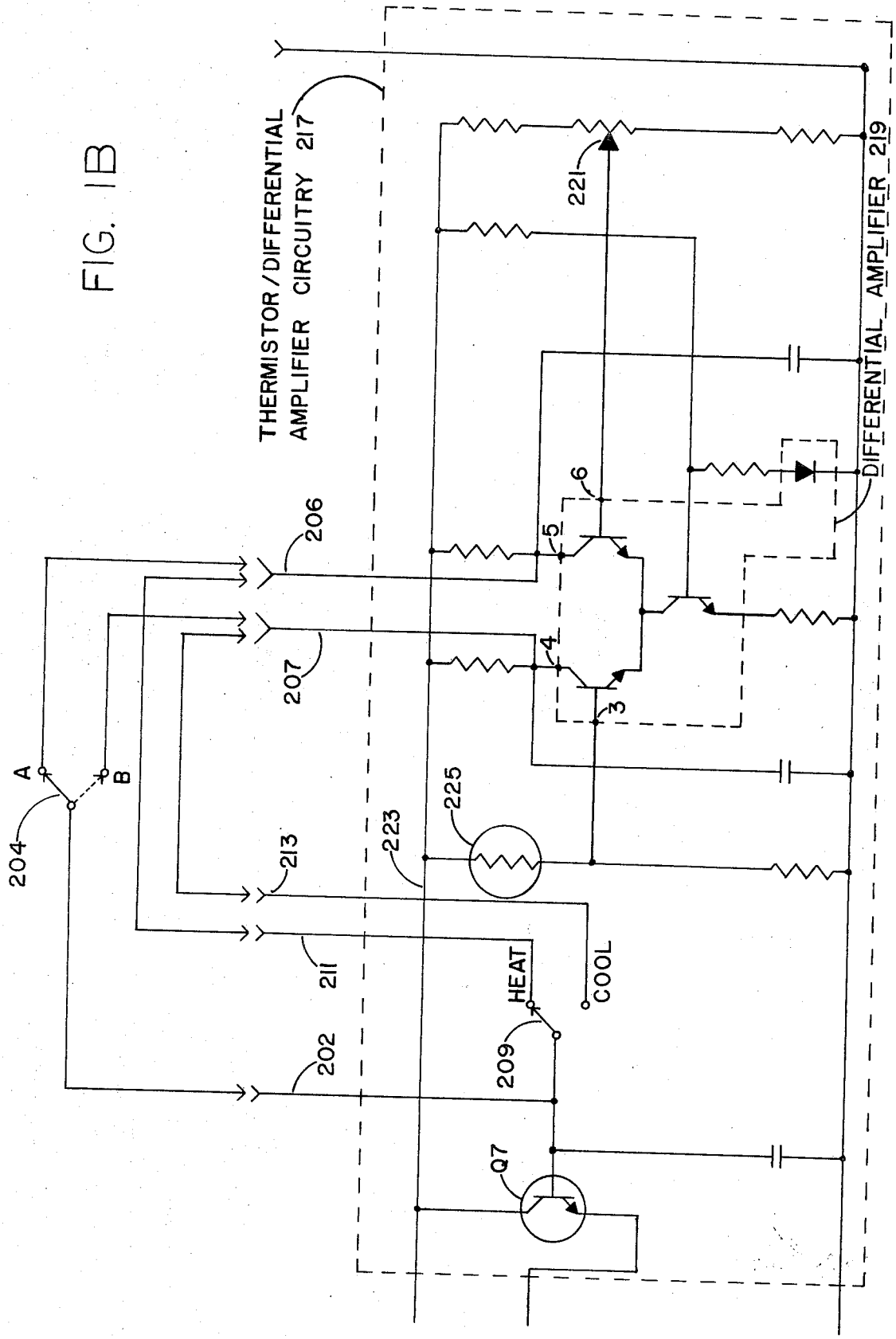

The circuit of FIGS. 1A and 1B is designed for use with either a two-pipe or four-pipe water heating and cooling system. The circuit, however, could be adapted for use with heating and cooling systems utilizing other heat-conveying media. If the circuit is used with a two-pipe system (one in which hot and cold water are alternatively, but not simultaneously available in the distribution pipes for heating or cooling purposes), a conductor 202 of FIG. 1B would be connected to the pole of a switch 204 whose stationary contacts A and B would be connected to conductors 206 and 207 respectively. Switch 204 might illustratively be actuated by a so-called aquastat which would be responsive to the temperature of the water in the pipes for closing the switch on contact A when the temperature of the water was hot and on contact B when the temperature of the water was cold. Switches 209 and 101 of the FIG. 1 circuit would not be utilized with a two-pipe system, i.e., their stationary contacts would be disconnected.

If the FIG. 1 circuit were used with a four-pipe system (one in which both hot water and cold water are simultaneously available for use in heating and cooling), conductors 103 and 105 of FIG. 1A would be connected to a hot water solenoid and a cold water solenoid respectively and conductors 211 and 213 of FIG. 1B would be connected to conductors 206 and 207 respectively. Then, when heating was desired, switches 101 and 209 would be closed on their upper contacts (the two switches would actually be a single two-pole switch) and when cooling was desired, the switches 101 and 209 would be closed on their lower contacts. When switch 101 is closed on its upper contact, and when an on-off switch 107 is closed on its "on" contact, an A.C. signal from an A.C. signal source 109 is supplied via switches 107 and 101 to the hot water solenoid (connected to conductor 103) thereby operating the solenoid to allow circulation of hot water in the distribution pipes. Conversely, when switch 101 is closed on its lower contact and switch 107 is closed on its "on" contact, a signal is supplied to the cold water solenoid thereby operating the solenoid to allow circulation of cold water in the distribution pipes.

To facilitate ease of description, the FIG. 1 circuit is divided into a power control circuity portion 111, a motor speed control signal generation circuitry portion 113 and a thermistor/differential amplifier circuitry portion 217. The circuitry 113 also includes a hysteresis circuitry portion 115. The operation of each of these circuitry portions will now be described.

The thermistor/differential amplifier circuitry 217 provides for generating a signal which is either proportional or inversely proportional to room temperature, depending upon whether the heating and cooling system is in a heating cycle or a cooling cycle respectively. The circuitry 217 includes a standard differential amplifier 219 which produces two signal outputs, one at node 4 and the other at node 5 whose relative amplitudes are determined by the difference between room temperature and some predetermined temperature. A voltage signal representing the value of the predetermined temperature is applied to node 6 of the differential amplifier 219 from a potentiometer 221. The value of this voltage input signal, and thus of the predetermined temperature (hereinafter referred to as "set temperature") is established by appropriately setting the potentiometer 221. A full-wave rectified A.C. voltage signal is applied to the potentiometer 221 via a conductor 223 from a full-wave bridge rectifier 119, which rectifies the A.C. signal received via the switch 107 (when the switch is in the "on" position) from the A.C. signal source 109.

A voltage signal representing the value of the room temperature is derived from a thermistor 225 and applied to node 3 of the differential amplifier 219. The resistance of the thermistor 225 varies inversely with the room temperature so that as the room temperature increases, the full-wave rectified A.C. voltage (hereinafter referred to simply as "voltage") across the thermistor 225 decreases and thus the voltage at node 3 of the differential amplifier increases. As the room temperature decreases, the voltage drop across the thermistor 225 increases and thus the voltage at node 3 of differential amplifier 219 decreases. As the voltage at node 3 increases, the voltage at node 4 decreases and the voltage at node 5 increases (and vice versa). It is apparent that when the voltages at node 3 and node 6 are equal, the voltages at node 4 and 5 will be equal. For any given room temperature, the value of the voltages at node 4 and 5 of the differential amplifier 219 may be changed by adjusting the variable resistor 221. Thus, as will become clear later, control of the heating and cooling system, and thus of the room temperature may be effected by appropriate adjustment of the potentiometer 221. In practice, the wiper terminal of the potentiometer would be mechanically ganged to an adjustment knob or wheel and would include a scale appropriately calibrated over a range of desired temperatures.

Nodes 4 and 5 of the differential amplifier 219 are connected to the conductors 207 and 206 respectively which, as indicated earlier, are connected to conductors 213 and 211 respectively when a four-pipe heating and cooling system is used, and are connected to contacts B and A respectively of the switch 204 when a two-pipe heating and cooling system is used. In either case, when the system is in a heating cycle, the voltage signal developed at node 5 is applied to the base of an NPN-type transistor Q7 and when the system is in a cooling cycle, the voltage signal developed at node 4 is applied to the base of the transistor Q7. The collector of the transistor Q7 is connected to the conductor 223 and the emitter of the transistor is connected to the motor speed control signal generation circuitry 113. When the voltage signal at the base of the transistor Q7 increases, the voltage signal applied from the conductor 223 via the transistor Q7 to the circuitry 113 increases; conversely, when the voltage signal at the base of the transistor Q7 decreases, the voltage signal applied via transistor Q7 to the circuitry 113 decreases. (It should be remembered that the voltage received over conductor 223 is a full-wave rectified A.C. voltage.)

In response to certain signals from the transistor Q7, the motor speed control signal generation circuitry 113 applies a motor speed control signal via a conductor 121 to the power control circuitry 111. In response to certain other signals from the transistor Q7, the circuitry 113 generates no speed control signal whatever. The speed control signal, which consists of a negative-going pulse every half cycle of the A.C. signal source 109, serves to actuate the power control circuitry 111 to control the amount of current applied by an A.C. power source 123 to a motor 125 which drives the fan or blower of the heating and cooling system. If no speed control signal is applied to the power control circuitry 111, then the A.C. power source 123 is inhibited from applying current to the motor 125.

The power control circuitry 111 may comprise any one of a number of different configurations well-known in the art. FIG. 1A shows one exemplary configuration which includes a bilateral triode switch 127 whose power electrodes are connected in series with the A.C. power supply 123 and the motor 125. The operation of the bilateral triode switch 127, i.e., whether the switch is in a low impedance or a high impedance state, is controlled by the flow of current through a diode 129 to the control electrode of the switch 127. The flow of current through the secondary winding of the transformer 131, and thus through the diode 129, is, in turn, controlled by the speed control signal applied by the circuitry 113 to the primary winding of the transformer 131. The speed of the motor 125 is determined by the amount of current conducted by the bilateral switch 127, i.e., by the amount of time during each half cycle of the A.C. power source 123 in which the switch 127 is in the low impedance state—this, in turn, is determined by the point in time during each half cycle of the A.C. power supply 123 at which the speed control signals are generated by the circuitry 113. Thus, the later in each half cycle a pulse is applied by the circuitry 113 to the circuitry 111, the later will the bilateral switch 127 be caused to conduct and thus the less will be the amount of current applied by the A.C. power source 123 to the motor 125 thereby reducing the speed of the motor. Alternatively, the earlier in each half cycle at which the circuitry 113 applies a pulse to the circuitry 111, the earlier will the bilateral switch 127 be caused to conduct in the half cycle and thus the greater will be the amount of current applied by the A.C. power source 123 to the motor 125 thereby increasing the speed of motor.

The motor speed control signal generation circuitry 113 includes a full-wave bridge rectifier 119 for providing a pulsating D.C. signal input to the rest of the circuitry 113, and a Zener diode 133 and a dropping resistor 135 connected in series with the rectifier 119 for providing a substantially constant peak voltage drop between nodes n1 and n2. A capacitor 139 is provided to supply a substantially constant D.C voltage to a PNP-type transistor Q6 for reasons to be discussed later. The capacitor 139 is charged via a diode 137 to the substantially constant D.C. voltage.

The circuitry 113 also includes a first programmable unijunction transistor (PUT) Q2 which is provided to develop the speed control signal which is supplied to the power control circuitry 111. A second PUT Q4 is provided to either enable or inhibit the generation of the speed control signal by the PUT Q2 by either the non-generation or generation respectively of a cut-off control signal which is supplied to hysteresis circuitry 115. One side of a capacitor 141 is connected to a power electrode of each of the PUT's Q2 and Q4 for providing a firing voltage signal therefor. The capacitor 141 is charged via a resistor 144 and a diode 145 which interconnect that node n1 to the capacitor, and also via a resistor 143 which also interconnects the node n1 to the capacitor 141.

During each half cycle of the A.C. signal source 109, the voltage on the capacitor 141 increases until either PUT Q2 or PUT Q4, but not both, fires, i.e., assumes a low impedance condition across its power electrodes. Operation or firing of the PUT's Q2 and Q4 is controlled by voltage signals applied to the respective gate electrodes thereof. A portion of the signal generated by the circuitry 217, and specifically by the transistor Q7, is applied via a potentiometer 147 and a resistor 149 to the gate electrode of the PUT Q2. As the magnitude of this signal increases—for example, because of an increase in temperature and the system is in a heating cycle or because of a decrease in temperature and the system is in a cooling cycle—a greater voltage across the capacitor 141 is required to fire the PUT Q2. Specifically, the voltage across the capacitor 141 must be slightly greater than the voltage applied to the gate electrode of the PUT Q2 in order to fire the PUT. If a larger voltage across the capacitor 141 is required to fire PUT Q2, then firing will take place at a later time in each half cycle of the A.C. signal from the A.C. signal source 109 because a longer time is needed to sufficiently charge the capacitor. When the PUT Q2 fires (assumes a low impedance condition), the charge on the capacitor 141 flows via the PUT Q2 to the base of an NPN-type transistor Q3 causing the transistor to turn on. When the transistor Q3 turns on, a negative-going speed control signal is applied via the conductor 121 to the power control circuitry 111 as previously discussed.

To briefly summarize the generation of the speed control signal in the context of the heating and cooling system operation, when the system is in a heating cycle and the room temperature increases so that it is desirable that the fan or blower motor 125 decreases in speed, the signal applied via the transistor Q7 to the gate electrode of the PUT Q2 increases causing the PUT Q2 to fire later in each half cycle of the signal from the A.C. signal source 109. This, in turn, causes the transistor Q3 to conduct later in the half cycle so that the motor speed control signal pulse is applied to the power control circuitry 111 later in the half cycle. When the speed control signal pulses are applied later in the half cycle the speed of the motor 125 is reduced as desired. When in the heating cycle and the temperature decreases, the speed of the motor 125 will be increased. As will be explained later, temperature variation which causes a variation in the speed of the motor occurs within a certain temperature range—when outside this range, the motor either runs at some maximum speed or is turned off. When in a cooling cycle and the temperature increases making it desirable to increase the speed of the fan or blower motor 125 (to move more cool air into the room or area to be conditioned), the signal applied via the transistor Q7 to the gate electrode of the PUT Q2 decreases in magnitude causing the PUT Q2 to fire earlier in the half cycle, which in turn causes the transistor Q3 to turn on earlier in the half cycle and the speed of the motor 125 is increased.

The potentiometer 147 is provided to enable calibration of the FIG. 1 circuitry, i.e., to establish a particular motor speed for a given gate electrode voltage of the PUT Q2.

An NPN-type transistor Q1 is included in the circuitry 113 to establish and control the maximum operating speed of the motor 125. The base of the transistor Q1 is connected to the wiper terminal of a potentiometer 151 whose two end terminals are connected to nodes n1 and n2. The collector of the transistor Q1 is connected to node n1 and the emitter of the transistor is connected to the wiper terminal of the potentiometer 147. The transistor Q1 establishes or limits the maximum speed of the motor 125 by providing a certain minimum voltage signal to the gate electrode of the PUT Q2. Thus, regardless of the magnitude of the voltage signal applied by the transistor Q7 to the potentiometer 147, a certain minimum voltage signal will always be applied to the gate electrode of the PUT Q2 and this, of course, establishes a maximum speed for the motor 125. This maximum speed may be varied simply by adjusting the wiper terminal of the potentiometer 151.

As indicated earlier, the PUT Q4 is provided to either enable or inhibit the opeation of the PUT Q2 and thus enable or inhibt the generation of the speed control signal applied to the power control circuitry 111. Assuming that the firing characteristics of the PUT's Q2 and Q4 are the same, then the relative magnitudes of the voltages applied to the respective gate electrodes thereof determines which of the PUT's fires. If the voltage at the gate electrode of the PUT Q2 is lower than the voltage at the gate electrode of the PUT Q4, then the PUT Q2 will fire first, discharging the capacitor 141 and thus preventing the firing of the PUT Q4. Similarly, if the PUT Q4 fires first, then the PUT Q2 is prevented from firing. If the PUT Q2 does not fire, then no speed control signal is applied to the conductor 121. By appropriately setting the wiper terminal of a potentiometer 153 which is connected to the gate electrode of the PUT Q4, the speed (of the motor 125) at which the PUT Q2 is prevented from firing can be selected. Thus, if the voltage at the gate electrode of the PUT Q4 is increased by moving the wiper terminal of the potentiometer 153 upwardly, the speed of the motor 125 at which the PUT Q2 is prevented from firing (the cutoff speed) is decreased and vice versa.

When the PUT Q4 is caused to fire (assume a low impedance condition) by the increase of the voltage at the gate electrode of the PUT Q2 to a level higher than the voltage at the gate electrode of the PUT Q4, a cutoff control signal pulse is generated by the flow of the charge stored on the capacitor 141 through the PUT Q4 and is applied via a capacitor 155 to the base of an NPN-type transistor Q5 of the hysteresis circuitry 115. This pulse causes the transistor Q5 to turn on thereby lowering the voltage at the base of PNP-type transistor Q6. With the voltage at the base of the transistor Q6 lowered, the transistor turns on thereby raising the voltage level at the base of the transistor Q5 and "clamping" or "locking" the transistors Q5 and Q6 in the "on" condition. As indicated earlier, the capacitor 139 supplies a substantially constant D.C. voltage to the transistor Q6 and hence to the base of the transistor Q5 so that the two transistors are maintained in the "on" condition.

When the transistor Q5 turns on, the voltage at the lower terminal of the potentiometer 153, which is connected via a resistor 159 and a diode 161 to the collector of the transistor Q5, is decreased. Decreasing the voltage at the lower end of the potentiometer 153 also decreases the voltage applied to the gate electrode of the PUT Q4 which, in effect, decreases the magnitude of the firing signal from the capacitor 141 necessary to fire the PUT Q4. Since the magnitude of the signal necessary to fire the PUT Q4 is decreased, the PUT Q2 is less likely to fire, i.e., the PUT Q2 will not now fire over a range of values of the signal applied to the gate electrode of the PUT Q2 where it previously would. Thus, in order for the PUT Q2 to fire, the voltage level at the gate electrode thereof must fall some amount below the peak voltage level at which the PUT would previously fire. This means that once the PUT Q4 has fired at a first room temperature to turn off the motor 125, the PUT Q2 will not again fire to turn the motor back on until a second room temperature, in the direction of and beyond the first room temperature, is reached. When the voltage at the gate electrode of PUT Q2 falls to a level where the PUT will again fire, the PUT fires causing application of a positive-going pulse via a capacitor 157 to the base of the transistor Q6. This pulse turns the transistor off thereby lowering the voltage at the base of the transistor Q5 causing Q5 to turn off. This, in effect, "unclamps" or "unlocks" the two transistors from the "on" condition placing them in the "off" condition. When the transistor Q5 turns off, the voltage at the lower terminal of the potentiometer 153 is increased to the level at which it was prior to the transistors being Q5 and Q6 being clamped in the "on" condition. The magnitude of the firing pulse necessary to fire the PUT Q4 is thus increased to its former level so that the motor 125 will not be turned off until the room temperature reaches the first temperature again. This hysteresis effect is desirable to prevent on-off cycling of the motor when small fluctuations occur about the temperature level at which the motor is normally turned off (or turned on).

An example of the operation of the hysteresis circuitry 115 in terms of room temperature control will now be given to better illustrate the advantages of the circuitry. Assume that the system is in a heating cycle and that when the room temperature is at a value equal to the "set temperature" established by the potentiometer 221 of FIG. 1B, the voltage signal applied via the transistor Q7 and the potentiometer 147 to the gate electrode of the PUT Q2 is just at the level at which the PUT Q4 will fire to prevent the firing of the PUT Q2. Under these circumstances, the speed control signal applied to the power control circuitry 111 will not be generated and the motor 125 will be turned off when the room temperature reaches the "set temperature" and, of course, at any values of the room temperature above the "set temperature." If the hysteresis circuitry 115 were not provided, when the room temperature fell slightly below the "set temperature," the speed control signal would again be generated causing the motor 125 to turn on. Presumably, after the motor again turned on, the room temperature would rise to the "set temperature" and the motor 125 would again turn off. This on-off cycling would continue with small fluctuations of temperature about the "set temperature." By providing the hysteresis circuitry 115, once the motor 125 is turned off upon the room temperature reaching the "set temperature," it will not be caused to turn on again until the room temperature falls to a predetermined temperature level below the "set temperature." This, of course, is brought about by changing the firing conditions of the PUT Q4 and thus of the PUT Q2 as already described.

The diode 161 of the hysteresis circuitry 115 is provided to prevent the application of current from the base electrode of the transistor Q6 to the bottom terminal of the potentiometer 153 which could upset the "locking" and "unlocking" characteristics of the hysteresis circuitry 115. Capacitors 155 and 157 are provided to block the transfer of D.C. signals in the respective circuits in which the capacitors are connected. The various resistors shown in the FIG. 1 circuit and not specifically discussed provide either a biasing or current limiting function which will be apparent from their location in the circuit.

It is to understood that the above-described embodiment is only illustrative of the principles of the present invention. Other embodiments may be described by those skilled in the art without departing from the spirit and scope of the invention. The appended claims are intended to cover such embodiments.

What is claimed is:

1. A motor speed control circuit including:
   means for generating a difference signal whose value represents the difference between the value of some environmental parameter and a predetermined value,
   means responsive to said difference signal for generating a motor speed control signal having a value determined by the value of said difference signal,
   said motor speed control signal generation means including means for generating a first signal proportional to said difference signal, means for generating a predetermined second signal having first and second amplitude levels, said first level being greater than said second level, and means for generating said motor speed control signal when the amplitude of said first signal is smaller than the amplitude of said second signal, and
   means for preventing the generation of said motor speed control signal when said difference signal varies in one direction to a first value and for enabling the generation of said motor speed control signal when said difference signal varies in the other direction beyond said first value to a second value, said preventing and enabling means including means responsive to the amplitude of said first signal exceeding said first amplitude of said second signal for generating a cut-off control signal and means responsive to said cut-off control signal for clamping the amplitude of said second signal at said second level.

2. A circuit as in claim 1 wherein said preventing and enabling means further includes means responsive to the amplitude of said first signal falling below said second level amplitude of said second signal for generating an unclamping signal, and wherein said clamping means includes means responsive to said unclamping signal for causing the amplitude of said second signal to be increased to said first level.

3. A motor speed control circuit including means responsive to a difference in value between a first signal whose value represents an environmental parameter and a second signal whose value is predetermined for producing a difference signal whose value represents such difference, means for generating a firing signal, means for generating a motor speed control signal when the amplitude of said firing signal exceeds a certain level determined by the amplitude of said difference signal, the value of said motor speed control signal being a function of the value of said difference signal, means for generating a third signal having either first or second amplitude levels, the amplitude of said third signal being at said first level when said motor speed control signal is being generated, means operative to prevent the generation of said motor speed control signal when the amplitude of said firing signal exceeds a particular level determined by the amplitude of said third signal, and means responsive to the operation of said preventing means for causing said third signal generating means to change the amplitude of said third signal to said second level to thereby vary said particular level and thus the level of said firing signal at which said preventing means operates.

4. A circuit as in claim 3 wherein said firing signal generating means includes a capacitor and a power source for charging said capacitor, said third signal generating means includes a potentiometer for generating a voltage signal at one terminal thereof, said voltage signal having either a first amplitude level or a second amplitude level, lower than said first amplitude level, the other terminal of said potentiometer being connected to a power source, said preventing means includes a triode switch having two power electrodes and a gate elctrode, one power electrode of which is connected to said capacitor and the gate electrode of which is connected to the tap of said potentiometer, said triode switch assuming a low impedance condition between the power electrodes thereof when the voltage across said capacitor exceeds the voltage at said gate electrode to thereby conduct current discharging said capacitor and preventing the generation of said motor speed control signal, and said causing means includes a locking circuit responsive to the conduction of current by said triode switch for clamping the voltage at said one terminal of said potentiometer to said second level.

5. A circuit as in claim 4 wherein said clamping circuit includes means responsive to the generation of said motor speed control signal for enabling the voltage at said one terminal of said potentiometer to increase to said first level.

6. A circuit as in claim 5 wherein said locking circuit includes a first transistor whose base electrode is connected to said other power electrode of said triode switch and whose collector electrode is connected to said one terminal of said potentiometer, a resistor interconnecting a power source with the collector electrode of said first transistor, and a second transistor whose base electrode is connected to the junction of said resistor and said first transistor and whose collector electrode is connected to the base electrode of said first transistor, and wherein said enabling means includes a conductor interconnecting said motor speed control signal generating means and the base electrode of said second transistor.

7. A motor speed control circuit including:

means for generating first and second signals, the value of said first signal being proportional to some environmental parameter and the value of said second signal being inversely proportional to the environmental parameter, means responsive to an applied signal for generating a motor speed control signal having a value determined by the value of the applied signal, means responsive to said applied signal for preventing the generation of said motor speed control signal when said applied signal varies in one direction to a first value and for enabling the generation of said motor speed control signal when said applied signal varies in the other direction beyond the said first value to a second value, and means for selectively applying said first signal and said second signal to said motor speed control signal generating means and to said preventing and enabling means.

8. A motor speed control circuit as in claim 7 wherein said first and second signal generating means includes sensing means for generating a third signal whose value is inversely proportional to the value of the environmental parameter, and differential amplifier means for generating said first and second signals, said first signal being inversely proportional to the value of said third signal and said second signal being proportional to said third signal.

* * * * *